SOLID STATE POWER MAPPING INSTRUMENT

Filed Aug. 28, 1961 5 Sheets-Sheet 1

INVENTORS.
ROBERT STEINBERG
WILLIAM B. SCHWAB
BY
ATTORNEYS.

SOLID STATE POWER MAPPING INSTRUMENT

Filed Aug. 28, 1961 5 Sheets-Sheet 2

INVENTORS.
ROBERT STEINBERG
WILLIAM B. SCHWAB
BY
ATTORNEYS.

SOLID STATE POWER MAPPING INSTRUMENT

Filed Aug. 28, 1961 5 Sheets-Sheet 3

INVENTORS.
ROBERT STEINBERG
WILLIAM B. SCHWAB
BY
ATTORNEYS.

Dec. 8, 1964 R. STEINBERG ETAL 3,160,567

SOLID STATE POWER MAPPING INSTRUMENT

Filed Aug. 28, 1961 5 Sheets-Sheet 4

INVENTORS.
ROBERT STEINBERG
WILLIAM B. SCHWAB
BY
A. D. O'Brien
ATTORNEYS

INVENTORS.
ROBERT STEINBERG
WILLIAM B. SCHWAB
BY
ATTORNEYS.

3,160,567

SOLID STATE POWER MAPPING INSTRUMENT

Robert Steinberg, Fairview Park, and William B. Schwab, Cleveland, Ohio, assignors to the United States of America as represented by the Administrator of the National Aeronautics and Space Administration
Filed Aug. 28, 1961, Ser. No. 138,540
7 Claims. (Cl. 176—19)
(Granted under Title 35, U.S. Code (1952), sec. 266)

The invention described herein may be manufactured and used by or for the Government of the United States of America for governmental purposes without the payment of any royalties thereon or therefor.

This invention relates to detecting, recording and mapping apparatus, and has for its principal object the provision of improved arrangements for mapping flux and power in nuclear reactors.

An object of the invention is to provide safe, reliable, rugged, sturdy, easily positioned, fast acting means for mapping flux and power in a reactor having closely spaced fuel plates.

A further object of the invention is to enable mapping to be accomplished rapidly under water.

Still another object is to provide a small and compact detector probe which passes readily between fuel plates.

A further object is to minimize effect on the flux in a reactor during mapping thereof and to minimize possibility of marking fuel plates.

Still another object of the invention is to record exactly where a measurement is made.

Still another object of the invention is to enable detector probes to be positioned readily through shielding water and in the vicinity of control rod guide bearing supports which partly obscure fuel elements.

Still another object of the invention is to accomplish fine spatial resolution in the measurement. An additional object is to record measurements instantaneously as they are made without need for subsequent analysis of detecting elements.

Other and further objects, features and advantages of the invention will become apparent as the description proceeds.

In carrying out the invention in accordance with a preferred form thereof, detecting elements are employed comprising silicon pn junction wafers connected in series, each coated with enriched uranium-235. The detecting elements are mounted in fission probes and preferably a plurality of fission probes are employed with means for driving them automatically into space between fuel element plates. Each probe is enclosed in a probe housing, preferably composed of aluminum with signal leads and detecting element potted in paraffin within the housing. A probe guide is provided composed of a suitable material visible under water such as red polymethyl methacrylate and the guide is provided with a head containing a micro-switch and a groove with a micro-switch actuator extended into the groove so that the switch is actuated when the instrument is lowered through shielding water into the tank of a nuclear reactor and the micro-switch actuator engages the spacer comb of a fuel element. Preferably the probe guide head is provided with locating pins which prevent the micro-switch actuator from being engaged unless the guide pins rest between adjacent plates of the fuel element, in which position the probe housings are so located as to travel in spaces between plates when driven downward. For driving the probes downward, a motor is employed with limit switches for automatically reversing the direction of the motor and retracting the probes after a survey has been completed in a given portion of the reactor. A potentiometer is provided which is coupled to the drive motor and is provided with a digital voltmeter connected to the potentiometer for recording position of the detecting element.

A better understanding of the invention will be afforded by the following detailed description considered in conjunction with the accompanying drawing in which.

Figure 1:
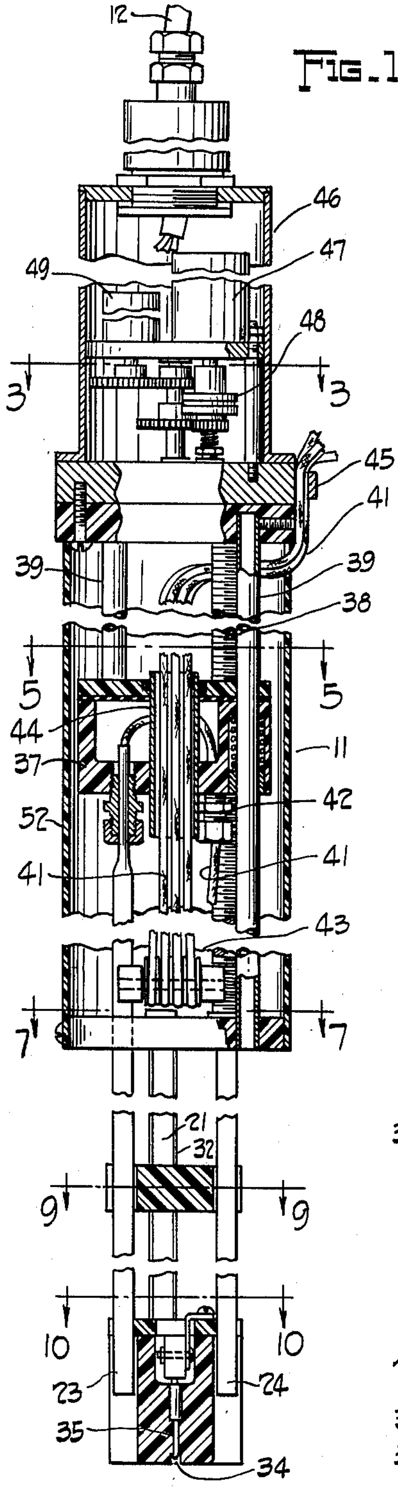
FIG. 1 is a view in section with portions broken away of an embodiment of the invention represented as cut by a vertical plane.
Figure 3:
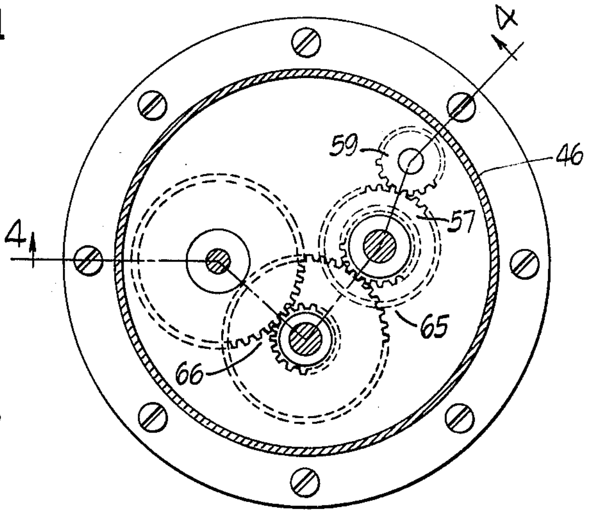
FIG. 3 is a cross-sectional view of the apparatus of FIG. 1 represented as cut by a plane 3—3 indicated in FIG. 1.
Figure 16:
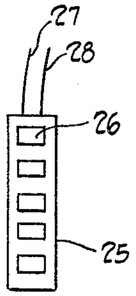
Figure 2:
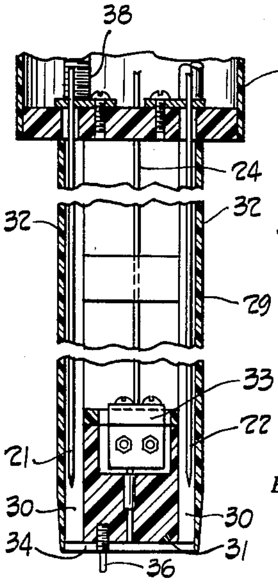
FIG. 2 is a fragmentary view of the apparatus of FIG. 1 represented as cut by a vertical plane transverse to the section plane of FIG. 1.
Figure 9:
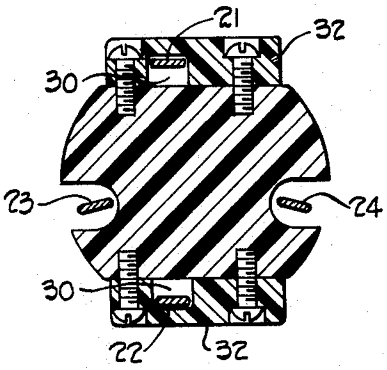
Figure 10:
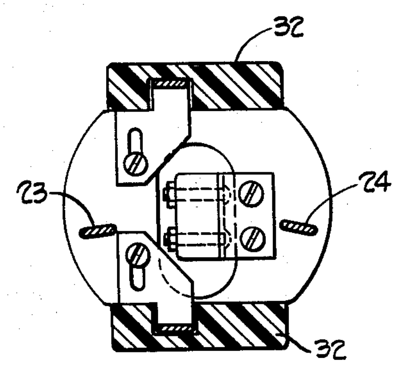
Figure 11:
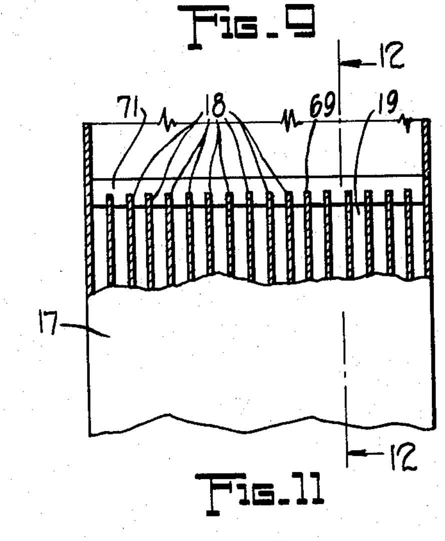
Figure 12:
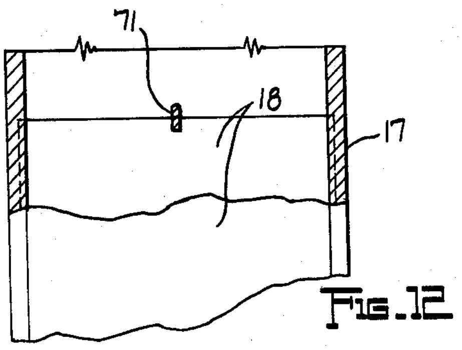
Figures 13, 14:
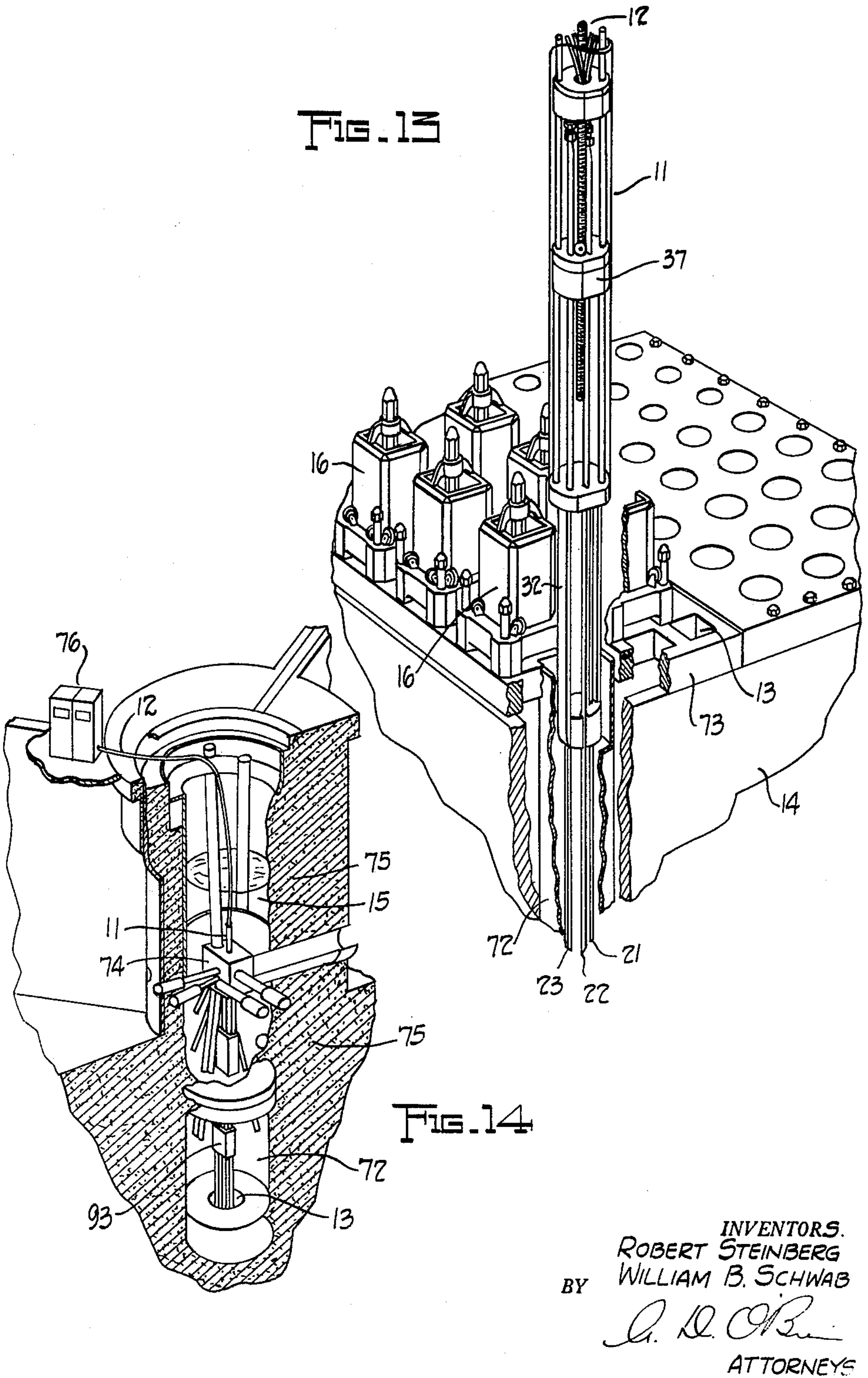
Figure 15:
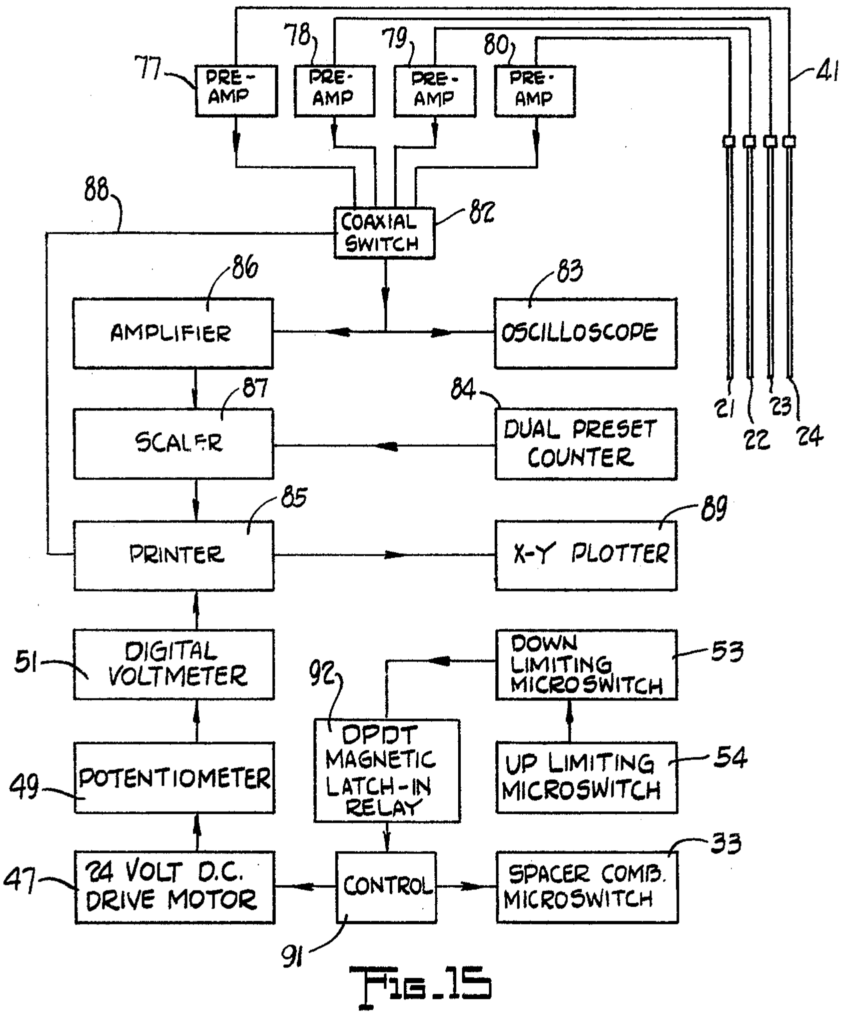

FIGS. 9 and 10 are views of cross-sections of the apparatus of FIG. 1 cut by the planes 9—9 and 10—10, respectively, indicated in FIG. 1, FIGS. 3 to 10, inclusive, being drawn at double the scale of FIGS. 1 and 2;

FIG. 11 is a view of an 18-plate fuel element and spacer comb partially in section with the upper end box removed;

FIG. 12 is an end view of the comb and plate assembly of FIG. 11, partially in section and with some of the plates broken away at their upper ends;

FIG. 13 is a perspective view of the rapid survey power mapping instrument of FIG. 1 in operating position in the fuel element with fission probes partially extended and the corner of the tank partially broken away;

FIG. 14 is a perspective view of the instrument of FIG. 1 in operating position in a concrete encased reactor tank, together with an instrument panel therefor;

FIG. 15 is a block diagram representing the electrical connections of the instrument panel and the detector probes; and FIG. 16 is an elevation of a detector unit.

Like reference characters are utilized throughout the drawings to designate like parts.

The start up of any new reactor facility involves a multitude of post-neutron tests that must be carried out before the reactor can be utilized for research or power production. An important post-neutron test that has heretofore been one of the most time consuming concerns the magnitude of the spatial variation of the flux within a core. Many of the computations of reactor behavior and experimental irradiations involve the flux. It is, therefore, important that the flux distribution should be known throughout the core in the greatest possible detail. Although instruments constructed in accordance with the invention are adaptable to most solid-fuel cores, the form of instrument illustrated and described is particularly useful in pool or tank reactors that employ aluminum-clad plate-type fuel elements.

The detector described is small enough, while retaining a relatively high sensitivity, to pass readily between the closely spaced fuel plates which may be spaced as closely as 2.80 mm. The probe itself is small and constructed of materials that not only minimize its effect upon the flux but also eliminates the possibility of marking the surface of the fuel plate. Moreover, the detector is easily positioned and means are provided to record exactly where the measurement is made, although it is positioned through three meters of shielding water and the fuel elements are partially obscured by the core structure material and the control rod guide bearing supports.

An instrument 11 is provided as illustrated in FIGS. 13 and 14, which may be suspended from its power cable 12 and be lowered successively into one fuel element 13 after another. In positioning the instrument 11, it is lowered between control rod bearing supports 16 when mapping those fuel elements which are adjacent to control rods.

The instrument 11 is shown in the form used for mapping the neutron flux in a reactor having 18-plate fuel elements such as illustrated in FIG. 11 where the fuel element 17 is shown with its spacer comb 71, but with the upper end box removed. The fuel plates 18 are parallel and in the reactor illustrated are curved to a 15.2 cm. radius and each measures 62.5 by 1.0 by 0.152 cm. with a 2.80 mm. water channel space 19 between plates 18. The power survey instrument 11 is provided with four fission probes 21, 22, 23 and 24 which are mounted longitudinally moveable with respect to the instrument 11 and capable of being simultaneously driven between adjacent fuel plates 18.

Each of the solid state fission probes 21 to 24, inclusive, is of the nature of a gaseous ionization chamber, in that the voltage pulse produced per incident ionizing particle depends upon the collection of electron-hole ($e$–$h$) pairs that are formed by the passage of the ionizing radiation. Each of the probes 21, 22, 23 and 24 comprises a detector unit 25 as shown in FIG. 16 containing a plurality of semi-conductor detecting elements 26 connected in series to a pair of leads 27 and 28. Each of the semi-conductor elements 26 consists of a single silicon pn junction wafer coated with uranium-235. A voltage pulse, produced by a neutron induced fission fragment, results from the collection of $e$–$h$ pairs in the region of the pn junction. While some recombination and trapping will occur, a large number of the $e$–$h$ pairs will travel to within a diffusion length of the pn junction and are separated by the field within the junction. The pulse thus produced is proportional to the particle energy divided by the junction capacitance and ionization potential of silicon.

Each of the housings for the probes 21 to 24, inclusive, is preferably constructed of aluminum with the detector unit 25 mounted in the lower end thereof and the two signal leads 27 and 28 running the length of the probe including the detector 25 potted in paraffin.

In order to permit high counting rates, a 22,000-ohm resistor is placed across the preamplifier input. This will not affect the pulse height, but reduces the decay time to about ten microseconds. The probe detecting unit as shown in FIG. 16 consists of a plurality, preferably ten, single silicon pn junction wafers in series; each wafer is coated with 90% enriched uranium-235. The series technique allows an increase in area and hence sensitivity without the proportional decrease in pulse height that would otherwise result from the capacitance effect.

The instrument 11 is provided with a probe guide 29 having a special head 31 secured to the remainder of the instrument by a pair of longitudinal side-guards 32, which may be composed of a suitable plastic or the like, with grooves 30 for the probes 21 and 22.

The probe guide head 31 contains a micro-switch 33 actuating a circuit that establishes the necessary $x$—$y$ coordinate system and allows the instrument to be positioned from its own supporting cable 12. The probe guide head 31 has a lower or leading surface formed with a narrow groove 34 into which a micro-switch actuator 35 extends. A pair of aluminum guide pins 36 are located on a line perpendicular to the direction of the groove 34. The probe guide head 31 is composed of a suitable resistant material, preferably visible under water. It is shaped to pass into the upper fuel element end box with plus or minus 0.79 mm. clearance. The invention is not limited to the use of a particular material for the composition of the probe guide head 31, but satisfactory results have been obtained by employing a colored plastic, such as red polymethyl methacrylate, such as that sold under the trade name Lucite, for example.

For moveably supporting the four probes 21, 22, 23 and 24, a water tight carriage 37 is provided to which the upper ends of the probes 21, 22, 23 and 24 are attached. The carriage 37, as shown, is hollow and is preferably composed of a resistant plastic material such as polymethyl methacrylate, for example. The carriage 37 is mounted for longitudinal movement in the instrument 11 by means of a drive screw 38, preferably composed of aluminum, and a pair of guide rods 39 which may be composed of stainless-steel.

In order to eliminate the possibility of signal cables becoming entangled in control rod mechanism, means are provided to take up the slack in individual signal cables 41 which are preferably coaxial cables. Each of the four coaxial cables 41 is connected to one of the pair of detector unit leads 27 and 28 in the upper end of one of the probe housings 21 to 24. Each of the signal cables 41 which enters the carriage 37 through the corresponding probe housing is allowed to reverse direction and leave through a water tight fitting 42 in the carriage. A weighted pulley 43 with four sleeves, one for each of the four cables 41 is provided which permits the coaxial signal cables 41 to reverse direction again by passing around the sheaves of the pulley 43 and to continue upward through a passageway 44 in the center of the water tight carriage 37. A clamp 45 is provided at the side of the instrument for holding the signal cables 41 securely in place.

At the upper end of the instrument 11 there is a motor housing 46 containing a drive motor 47 with associated slip-clutch mechanism 48 and a potentiometer 49 coupled to the drive screw 38. The clutch 48 is provided in case of misalignment; and the potentiometer 49 serves to record the position of the detectors within the fuel element. Preferably a digital voltmeter 51 indicated schematically in FIG. 15 is utilized in conjunction with the potentiometer 49.

For protecting the four fission probes 21 to 24 and adding rigidity to the carriage guides 39 and the drive screw 38, a housing tube 52 is provided, which may be composed of a suitable material such as polymethyl methacrylate. Only the motor housing 46 and the carriage 37 are water tight, however, the remainder of the instrument being allowed to fill with water. Micro-limit switches within the housing of the potentiometer 49 are provided at the upper and lower ends of travel. Such micro-switches are shown schematically in FIG. 15 including a down-limiting micro-switch 53 which reverses the direction of the motor 47 and the travel of the probes 21 to 24 when they reach the lower most position and an up-limiting micro-switch 54 which stops the motor 47 when the probes have reached their upper most position on the return travel. Direct-current power supply for the motor 47, the spacer-comb actuated micro-switch 33, a reversing circuit for the down-limit micro-switch 53 and a position readout for the potentiometer 49 are all carried in a main power cable 12 which serves also as the support for the instrument 11.

Figure 4:
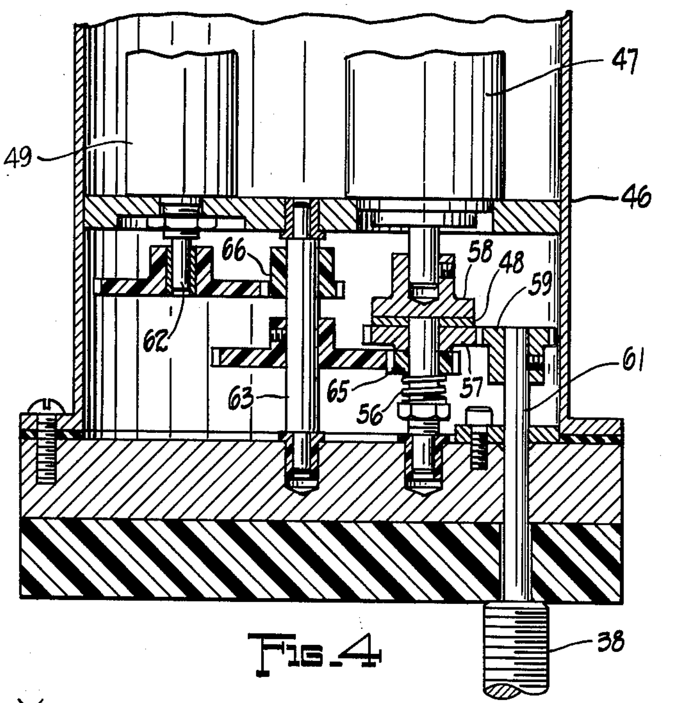
FIG. 4 is a fragmentary view of a portion of the apparatus of FIG. 1 represented as cut by a broken vertical plane 4—4 indicated in FIG. 3.

As shown in FIGS. 1 and 4, the slip-clutch 48 is of the friction-disk type having a compression spring 56 for urging a driven disk, clutch member 57 against a driving clutch-disk 58 carried by the motor shaft. The clutch disk 57 also carries gear teeth meshing with a gear 59 secured to an extension 61 of the drive screw 38.

Figures 5, 6:
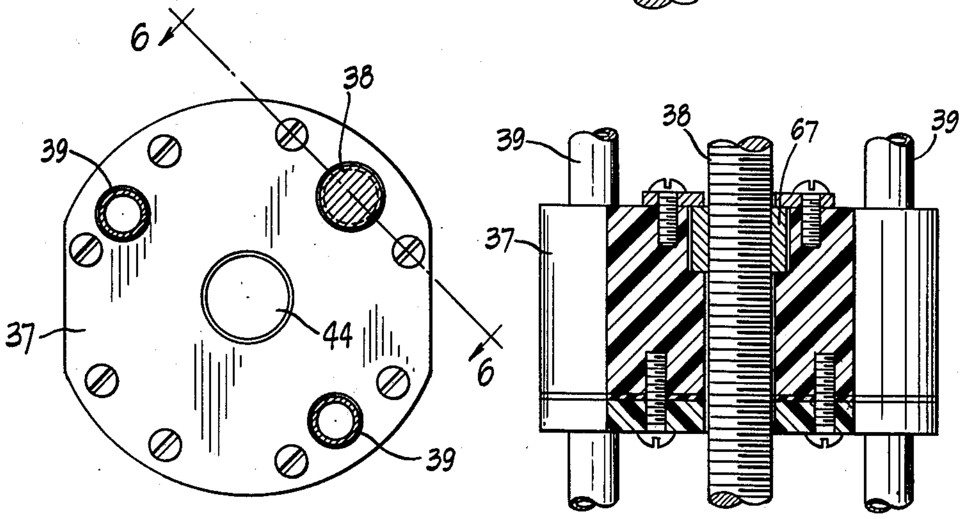
FIG. 5 is a cross-sectional view of the apparatus of FIG. 1 represented as cut by a plane 5—5 indicated in FIG. 1.
FIG. 6 is a fragmentary view of a portion of the apparatus of FIG. 1 represented as cut by a vertical plane 6—6 indicated in FIG. 5 and illustrating the arrangement of the drive screw, guide rods and probe carriage.
Figure 7:
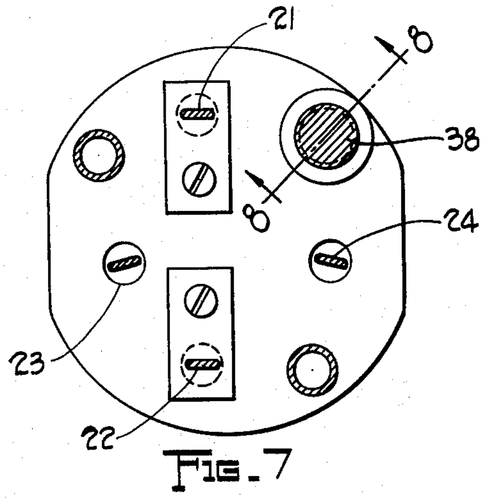
FIG. 7 is a view of a cross-section of the apparatus of FIG. 1 represented as cut by a plane 7—7 indicated in FIG. 1.
Figure 8:
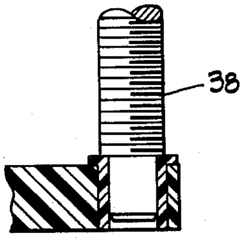
FIG. 8 is a fragmentary view in longitudinal, vertical section of the apparatus of FIG. 1 illustrating the drive-screw footing and illustrating the portion of the apparatus cut by the plane 8—8 indicated in FIG. 7.

The motor 47 is also arranged to drive the actuating shaft 62 of the potentiometer 49 through a jack shaft 63 and gearing 65 and 66. Driving connection between the drive screw 38 and the carriage 37 is made through a threaded block or nut 67 secured in the carriage 37 as shown in FIG. 6.

In order to use the instrument 11, it is lowered through the water 15 on its own supporting power cable 12. The plastic probe guide 31 is allowed to pass into the fuel element end box coming to rest atop the fuel plates 18. Because of the close fit between the probe guide and the fuel element and box, only one of three possible alternatives can occur.

(1) The guide pins 36 more to rest on the leading edge 69 of a fuel plate 18, in which case the spacer comb 71 could not possibly enter the groove 34 in the probe guide head 31 to actuate the micro-switch circuit by engaging the micro-switch actuator rod 35.

(2) The guide pins 36 have passed between two fuel plates 18 but the spacer comb 71 has not quite entered the groove 34 in the guide head 31, in which case the micro-switch circuit cannot be actuated.

(3) The guide pins 36 have passed between two of the fuel plates 18 and the fuel element spacer comb 71 has entered the groove 34, engaging the micro-switch actuator 35.

Should the instrument 11 not be positioned correctly on the first attempt, all that is required is to raise the instrument about two centimeters and then lower it again. Experience has shown that it takes no longer than 60 seconds to have the instrument seated correctly on the fuel element. A spacer comb actuated signal light (not shown) may be provided to indicate when the instrument 11 is in the correct operating position and the probes 21, 22, 23 and 24 are ready to be driven into the fuel element.

In FIG. 13, as shown, the instrument 11 is fully inserted, between control rods 93, in one of 22 fuel elements 72. The probe guide 29 passes between control rod guide bearings 16 through the top grid plate 73 and fuel element end box 74 (a total of 30.5 cm. in the specific apparatus illustrated) before the probe guide head 31 comes into contact with the top of the fuel plates 18. This may be accomplished although the control rod guide bearing supports 16 actually overhang the entrance to the fuel element and thus limit access to the plates 18. Where the bearing supports are not symmetrical and as a result the openings to the elements between control rods do not have the same dimensions as that of the remaining fuel elements an interchangable probe guide may be provided for the instrument 11. One such probe guide is provided for the four fuel elements between control rods and another for the remaining eighteen elements.

In the specific apparatus described, the detector 25 has a thermal neutron sensitivity of approximately $1 \times 10^{-3}$ counts per neutron per square centimeter. The useful detector lifetime is over $1 \times 10^{13}$ nvt.

The time involved in making a single traverse will be determined by the available power level, the desired accuracy in counting and the spatial resolution. An insertion rate of 15.2 cm. per minute at a power level of one watt has been chosen to obtain a minimum of 10,000 counts per second and a spatial resolution of 2.54 cm. Thus each of the four probes 21, 22, 23 and 24 will supply about 30 measurements, and the complete traverse will take approximately ten minutes (entry and withdrawal). If a higher resolution is desired, a smaller detector may be employed.

A cut away view of the assembly of the reactor tank 75 with the instrument 11 in operating position is shown in FIG. 14. An associated instrument control and readout panel 76 is shown just outside the reactor tank. Since the reactor will be operating at low power during a power mapping survey, only about 3 meters of shielding water 15 are shown above the fuel element core 72. A temporary platform (not shown) may be constructed inside the tank from which to lower the instrument 11 into position.

FIG. 15 is a block diagram of the control instrument and readout equipment 76 for the power survey instrument 11, as well as the circuitry contained within the device itself. Individual preamplifiers 77, 78, 79 and 80 are provided for the fission probes 21, 22, 23 and 24, respectively, in order to prevent loss of signal in the switching circuit and associated coaxial cable. A single counting channel is utilized with a solenoid-actuated coaxial switch 82 and cycles between probes 21 to 24. An oscilloscope 83 is provided for monitoring fission pulses, and a dual preset counter 84 is provided for controlling the counting channel. A paper tape printer 85 is provided for printing the data immediately, recording the probe number, position in the fuel element and the count rate. An amplifier 86 and a scaler 87 are interposed between the coaxial switch 82 and the printer 85, and there is an electrical connection 88 between the coaxial switch 82 and the printer 85 for synchronizing the print out for each probe with the probe connection.

There is a single $x—y$ point plotter 89 in conjunction with the printer 85 in order to afford a visual account of the power variation within the fuel element and to make the data instantly available for analysis upon completion of the traverse.

A motor speed control 91 is interposed between the spacer comb micro-switch 33 and the drive motor 47, and a double-pole, double-throw magnetic latch-in relay 92 is interposed between the limit switches 53 and 54 and the motor control contactor assembly 91 for reversing the connections and direction of rotation of the drive motor 47 when the down-limiting micro-switch 53 has been actuated, and opening the motor circuit upon the return travel when the up-limiting micro-switch 54 has been actuated.

While the invention has been described as embodied in concrete form and as operating in a specific manner in accordance with the provisions of the patent statutes, it will be understood that the invention is not limited thereto, since various modifications will suggest themselves to those skilled in the art without departing from the spirit of the invention.

What is claimed is:

1. A power survey instrument comprising in combination, a mounting tube, a plurality of fission probes, each of said probes including a detecting element comprising a plurality of silicon pn junction wafers connected in series, each of said wafers being coated with enriched uranium-235, a probe housing composed of aluminum enclosing each probe, signal leads therein and paraffin potting the leads and detector in each housing, a probe guide composed of red polymethyl methacrylate visible under water having a head containing a micro-switch, a supporting cable for the instrument, the probe guide head having a leading surface with a narrow groove therein running its length and a micro-switch actuator extending into the groove, a pair of aluminum guide pins located on a line perpendicular to the direction of said groove, within said mounting tube a water tight carriage composed of polymethyl methacrylate upon which the probes are mounted, an aluminum drive screw and a pair of stainless-steel guide rods carrying said carriage, coaxial signal cables for each probe, pulley mechanism for taking up slack in the signal cables as the probes are driven downward, a drive motor secured to the upper part of the instrument tube, a clutch interconnecting the motor with the drive screw, a potentiometer coupled to the drive screw, a digital voltmeter connected to the potentiometer for recording position of the fission-probe detecting elements, the motor having a water tight housing, the instrument-mounting tube being open to admission of water when the instrument is lowered into water shielding a nuclear reactor, limit switches at each end of travel of the carriage, and motor reversing switches responsive to the limit switches.

2. A power survey instrument for a water moderated reactor having fuel elements in the form of plates, said instrument comprising in combination a plurality of fission probes, each containing uranium-coated, solid-state detection means, a probe housing enclosing each probe, a probe guide composed of material visible under water having a head containing a micro-switch, a supporting cable for the instrument, the probe guide head having a leading surface with a groove therein and a micro-switch actuator extended into the groove, guide pins located on a line perpendicular to said groove, a water tight carriage upon which the probes are mounted, a drive screw and guide means carrying said carriage, coaxial signal cables for each probe, pulley mechanism for taking up slack in the signal cables as the probes are driven downward, a potentiometer coupled to the drive screw, voltage responsive means connected to the potentiometer for recording position of the detecting element, a motor having a water tight housing, limit switches at each end of travel of the carriage, and motor reversing switches responsive to the limit switches.

3. In a reactor having fuel elements in the form of spaced plates, a power survey instrument comprising a probe guide head having a leading surface with a groove therein, guide pins located on a line perpendicular to said groove for locating the guide head with respect to space between a pair of fuel element plates, a micro-switch carried by said head, a micro-switch actuator extending into said groove and located with respect to the guide pins for engaging a portion of the fuel element when the guide pins are located in a space between the plates, a fission detector, and a moveable probe carrying said fission detector.

4. Apparatus as in claim 3 including a potentiometer coupled to the probe drive means and voltage responsive means electrically connected to the potentiometer for recording the position of the fission detector.

5. A power survey instrument for a reactor with spaced fuel plates separated by an outwardly extending spacer member, said instrument comprising a probe guide head having a leading surface with a groove therein for locating the guide head with respect to space between fuel plates by mating with said spacer member, a fission detector, and means for driving the detector downward from said guide head when said groove is mated with said spacer member.

6. A power survey instrument comprising in combination, a mounting tube, a plurality of fission-probes, a probe housing enclosing each probe, signal leads in each housing, a probe guide having a head containing a micro-switch, a supporting cable for the instrument, the probe guide head having a leading surface with a narrow groove therein running its length and a micro-switch actuator extended into the groove, a pair of guide pins located on the line perpendicular to the direction of said groove, a water tight carriage within said mounting tube upon which said probes are mounted, a drive screw carrying said carriage, signal cables for each probe, means for taking up the slack in the signal cables as the probes are driven downward, a drive motor secured to the upper part of said tube, a clutch interconnecting the motor with the drive screw, a potentiometer coupled to the drive screw, a digital voltmeter connected to the potentiometer for recording position of the fission-probe detecting elements, said mounting tube being open to the admission of water when the instrument is lowered into water shielding a nuclear reactor, limit switches at each end of travel of said carriage, and motor reversing switches responsive to said limit switches.

7. A power survey instrument comprising in combination, a plurality of fission-probes, a probe housing enclosing each probe, a probe guide having a head containing a micro-switch, the probe guide head having a leading surface with a narrow groove therein and a micro-switch actuator extended into the groove, a pair of guide pins located on a line perpendicular to the direction of said groove, a water tight carriage upon which said probes are mounted, a drive screw carrying said carriage, signal cables for each probe, a drive motor, a clutch interconnecting the motor with said drive screw, a potentiometer coupled to the drive screw, and a digital voltmeter connected to the potentiometer for recording position of the fission-probe detecting element.

References Cited by the Examiner

UNITED STATES PATENTS

| | | | |
|---|---|---|---|
| 2,677,772 | 5/54 | Moon | 204—193.2 |
| 2,753,462 | 7/56 | Moyer | 204—193.2 |
| 2,847,585 | 8/58 | Christian | 204—193.2 |
| 2,867,727 | 1/59 | Welker | 204—193.2 |
| 2,988,639 | 6/61 | Welker | 204—193.2 |
| 2,997,587 | 8/61 | Mims | 204—193.2 |
| 3,043,954 | 7/62 | Boyd | 204—193.2 |

CARL D. QUARFORTH, *Primary Examiner.*